Sept. 28, 1965      M. E. NORDBERG      3,208,839
METHOD OF SHAPING A GLASS ARTICLE
Filed Feb. 27, 1961
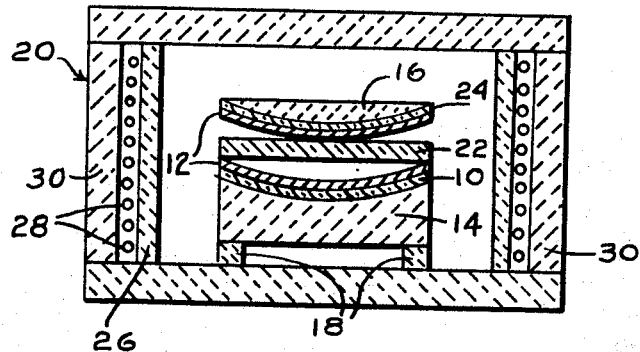
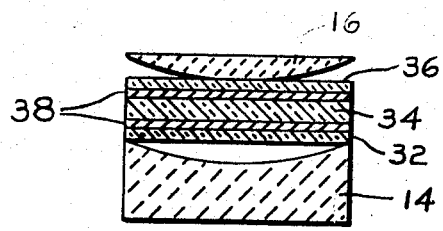
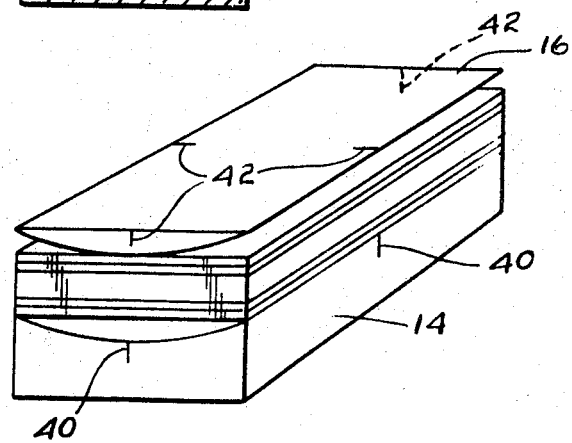
INVENTOR.
MARTIN E. NORDBERG
BY
Clarence R. Patty, Jr.
ATTORNEY 3,208,839
METHOD OF SHAPING A GLASS ARTICLE
Martin E. Nordberg, Corning, N.Y., assignor to Corning Glass Works, Corning, N.Y., a corporation of New York
Filed Feb. 27, 1961, Ser. No. 91,705
10 Claims. (Cl. 65—24)

This invention relates to improvements in the art of reshaping the surface of a glass body to conform with the contour of a surface of a mold or of a second glass body by contacting said surfaces while heated without the application of external pressure.

In the past it has been found advantageous to conform the surfaces of two glass bodies at a relatively low temperature, that is, a temperature within the annealing range of the softer glass, thereby obtaining precisely matched surface contours without laborious grinding and polishing operations. By thus conforming such surfaces, accurately fitted composite units such as an optical element, a laminated sheet, or the like can be produced.

One prior art technique has involved bringing together two glass surfaces, one of which it was desired to fit or cause to conform to the other, and then applying pressure to urge the surfaces into agreement in the presence of sufficient heat to release the stress set up by the pressure but without softening the surfaces. When this treatment is continued for a predetermined length of time, the surfaces will be found to be in essential contact and will remain so if the pressure is removed. By such a procedure it is possible to reduce the number of interference fringes between two glass surfaces from an initial value of 100 or more to less than 5.

In the conventional bending of sheet glass, one or more sheets are placed on a refractory base or mold having a desired contour and the base and the sheet or sheets are heated until the glass, without substantial change of thickness or other distortion, has conformed to the contour of the base.

Under the conditions of such methods there is an objectionable tendency for the contacting surfaces to adhere and become welded together, particularly if the temperature is in the highest part of the annealing range and more particularly also if the annealing ranges of the glasses are similar and/or the pressure is unduly long maintained.

Another prior art technique, such as described in J. T. Littleton Patent No. 2,795,084, has involved conformation of a surface of a glass body with the contour of a surface of another body, such as a metal or refractory mold or another glass body, by forming on the contacting glass surface or surfaces a parting film, specifically an adherent iridized metal oxide film, placing the bodies together and shaping the glass surface or surfaces, with or without the application of external pressure while the bodies are heated sufficiently to permit plastic flow and conformation of the glass.

While this method permits the utilization of higher temperatures, such as temperatures just below the softening point of the softer glass, thereby permitting conformation of the glass surface or surfaces at an increased speed, there is an objectionable tendency for the iridized metal oxide film to crack due to its brittle nature and its inherent characteristic to resist bending, the pattern of which cracks is imparted to and remains on the surface or surfaces of the conforming glass body. While the adhesion of the contacting surfaces may be prevented by this method, laborious grinding and polishing operations are required to remove the pattern of the cracks of the iridized metal oxide film.

Still another technique, described in the copending application of Willard L. Porter, Serial No. 91,704, filed concurrently herewith and assigned to a common assignee, involves conformation of a surface of a glass body with the contour of another body, such as a metal or refractory mold or another glass body, by applying to the contacting glass surface or surfaces an adherent laminar inorganic mineral film, placing the bodies together and shaping the glass surface or surfaces, without the application of external pressure, while the bodies are heated sufficiently to permit plastic flow and conformation of the glass.

This method also permits utilization of higher temperatures, such as temperatures just below the softening point of the softer glass and while the film is not brittle and does not impart crack patterns to the conforming glass surface, the method is limited to those compositions of glass which have a softening point lower than the melting temperature of the laminar inorganic mineral film. Conformation of glass having a softening point higher than the melting temperature of the laminar inorganic mineral results in the bonding of the mineral film to the glass surface thereby requiring buffing and polishing to remove it.

It is an object of the present invention to provide an improved method of conforming glass surfaces, whereby the contacting surfaces can be accurately matched without adhesion even at temperatures practically as high as the softening point of the softer glass. (Softening point is the temperature at which the viscosity of the glass is $10^{7.6}$ poises.)

Another object is to conform glass surfaces at an increased speed, particularly if the required amount of conformation be relatively slight.

Still another object is to attain an increase in the desirable optical qualities of conformed glass surfaces.

A further object is to conform glass surfaces without imparting irregularities to the surfaces from cracks in the parting film.

A still further object is to conform surfaces of glass bodies having compositions whose softening point is above the melting point of laminar inorganic minerals.

In accordance with the invention the method in its broader aspect comprises conforming the surface of a glass body or bodies with the contour of a surface of a glass-adherent body such as a metal mold and/or another glass body or bodies, by applying to the contacting glass surface or surfaces a uniform continuous film of colloidal refractory metallic oxide, which refractory metallic oxide has a melting temperature higher than the softening point of glass; placing the bodies together and shaping the glass surface or surfaces while the bodies are heated to a temperature above the strain point and below the softening point of the glass, for a time sufficient to permit sagging or plastic flow and conformation of the glass. (Strain point is the temperature at which the viscosity of the glass is $10^{14.5}$ poises.)

Ordinarily a porous type refractory mold, which does not adhere to glass, would be used. It is obvious, therefore, that the method of this invention would not apply to a situation where the mold material is non-adherent to glass and only a single glass body is placed in the mold. However, in practice such mold materials do not lend themselves to the production of high optical quality glass due to their inherent porosity and the consequent inability to apply a smooth finish to their surface, which subsequently results in imperfections or irregularities in the surface of the conformed glass. Therefore, when such refractory molds are used, the mold contours are covered with contoured glass bodies or the surfaces of the glass body or bodies, to be conformed, are protected with glass cover plates which are simultaneously conformed. It is also obvious that the method of this invention is required in all situations where the glass body to be conformed is in contact with glass-adherent means of conformation.

When a metal mold is used in place of a refractory mold, consideration must be given in addition to the glass adhesion noted above, to compensation of the mold contour dimensions for thermal expansion of the metal unless the application is such as to permit a variance in the glass body contour dimensions due to the thermal expansion of the metal. Furthermore, when high temperatures are required for the conforming process, the metal mold should be heated in an inert atmosphere to prevent oxidation of its surfaces.

For conforming a plurality of glass bodies the method comprises applying to the contacting surfaces of the glass bodies a uniform continuous film of colloidal refractory metallic oxide, placing the said bodies together and conforming the glass surfaces to each other as well as the contour of the refractory or metal mold or another glass body or bodies while the bodies are heated sufficiently to permit plastic flow.

The apparatus for carrying out a preferred method in accordance with the invention is illustrated in the accompanying drawing in which:

FIG. 1 is a sectional elevation showing three glass bodies, with a colloidal refractory metallic oxide film applied, disposed in a mold, one of which bodies is to be conformed to the shape of the other bodies in accordance with my invention, and FIG. 2 is a sectional elevation of a mold similar to that shown in FIG. 1 containing three flat glass bodies with a colloidal refractory metallic oxide film applied, all of which bodies are to be conformed to the shape of the mold and to each other in accordance with my invention, and FIG. 3 is an oblique view of a mold similar to those shown in FIGS. 1 and 2, with three flat glass bodies in place, illustrating indexing marks by means of which marks the mold parts and glass bodies to be conformed may be aligned prior to heating.

In FIG. 1 a glass body 10, provided with a colloidal refractory metallic oxide film 12, shown in exaggerated thickness, is disposed in a refractory mold comprising a mold bottom 14, and a mold top 16, said glass body 10, having a desired surface contour the same as mold bottom 14, being supported on refractory spacers 18, within heating chamber 20. A second glass body 22, having plane surfaces is disposed in said mold above the glass body 10. A third glass body 24, also provided with a colloidal refractory metallic oxide film 12, shown in exaggerated thickness and having a desired surface contour the same as the mold top 16, is disposed in the said mold above the glass body 22, below the mold top 16.

The three glass bodies together with the mold and support spacers are contained within a heating chamber, comprising a core 26, surrounded by an electrical heating element 28, and walls 30, composed of insulating refractory material.

In FIG. 2 a mold similar to that shown in FIG. 1 contains three glass bodies 32, 34, and 36, having substantially plane contacting surfaces, which glass contacting surfaces of glass bodies 32 and 36, are provided with a uniform continuous colloidal refractory metallic oxide film 38, shown in exaggerated thickness.

In FIG. 3 a mold, similar to those shown in FIGS. 1 and 2 contains three glass bodies with plane contacting surfaces provided with a uniform continuous colloidal refractory metallic oxide film as shown in FIG. 2, is shown with indexing marks 40, on all four sides of mold bottom 14, and indexing marks 42, on all four sides of mold top 16. By proper alignment of the indexing marks the mold parts and glass bodies will be in position to permit conformation to the desired contour.

A thin colloidal refractory metallic oxide film suitable for the present purpose may be applied to the glass by mechanical means. Such a process comprises immersing the glass in an aqueous colloidal solution of a refractory metallic oxide in fibril form, after which the excess fibrils are removed and the film is dried.

Such colloidal refractory metallic oxide films are generally transparent and their thickness is controlled by the concentration of the colloidal solution as well as the removal of the excess fibrils. While a thickness of one continuous layer of fibrils is sufficient to prevent adhesion of the glass surfaces according to the invention, greater thicknesses may be used without any difficulties or disadvantages. Since the fibrils of refractory metallic oxides are generally long and thin in shape, some overlapping will occur to obtain a continuous film upon the glass surface. It should be noted, however, that such fibrils are usually less than one micron in length and are, therefore, substantially less than one micron in thickness.

Some examples of refractory metallic oxides are: alumina, zirconia, stannic oxide, titania, as well as others. Colloidal alumina is particularly suitable since it is readily and economically available and the resulting film is transparent.

To produce such colloidal refractory metallic oxide films, the colloidal metallic oxide should be in powder form, said powder consisting of clusters of minute fibrils desirably having a length of approximately one micron or less, although larger fibrils will also be suitable. This powder is then dispersed in water to yield sols of ultimate positively charged fibrils which are strongly attracted to the negative glass surface. In accordance with this invention, a colloidal solution of metallic oxide ranging from 0.1% to 2% by weight is prepared. The clean glass body is then immersed in said solution and a film of fibrils is deposited on its surface. The excess fibrils are rinsed off in distilled water leaving a thin uniform layer of fibrils on the glass surface. After air drying, such a layer or film will range in thickness from approximately 50 Angstroms to 0.1 micron depending on the concentration of the colloidal solution. It should be noted that the fibrils lie flat on the glass surface due to the said attraction between the glass and the fibrils.

A film applied in this manner, cannot be rinsed off with water, however, it is not strongly attached and may be easily rubbed off. In order to harden said film and thereby facilitate practical handling and to obtain superior adhesion between the film and the glass surface, the glass body with film thereon is baked at approximately 450° C. Such a baked film resists mechanical removal even by methods such as scouring.

It has been found that a thin uniform continuous film of colloidal refractory metallic oxide applied in accordance with the method described above and which adheres strongly to the glass surface, when baked, will not permit the glass surface to adhere to another glass surface or to metal under conditions of heat required to conform glass surfaces to the desired shape. Glass surfaces, shaped by the new method, therefore, do not adhere to each other but can be separated after conformation and are as accurately matched as if the colloidal refractory metallic oxide film had been absent and the glass surface does not have any patterns resulting from cracks of the film or other deformations.

A preferred method of carrying out the present invention is illustrated in FIG. 1 of the drawing. The glass bodies 10, 22, and 24, are cleaned by any one of various commercial methods for removing dirt, grease, oils and the like, and are subsequently dried. A thin continuous uniform film of colloidal alumina 12, is applied to at least one surface of each of the glass bodies 10 and 24, as shown in FIG. 1, and it is obvious that such a film may be applied in the alternative to both surfaces of glass body 22, with equivalent results. The glass body 22 is placed between glass bodies 10 and 24, in contact with the colloidal alumina film applied thereto, and all of the glass bodies are placed in the refractory mold bottom 14, with glass body 10, in contact with said mold bottom. The refractory mold top 16, is placed above glass body 24, and the entire assembly is then properly indexed, by means of the indexing marks 40 and 42, shown in FIG. 3, to provide proper alignment among the glass bodies and the mold parts. The assembly is placed in the heating chamber 20, and sufficient electric current is passed through the heating element 28, to heat the mold parts 14 and 16, and the glass bodies 10, 22, and 24, to just below the softening point of the glass, or a temperature at which the viscosity of the glass is slightly above $10^{7.6}$ poises. This temperature is then maintained permitting the glass body 22, to sag, through plastic flow into the cavity of mold bottom 14. While the said glass body sags into the cavity the glass body 24, and the mold top 16, lower to produce the top surface contour of the glass body 22. When the glass body has fully conformed to the mold and the contoured glass bodies, the electric current is interrupted. When the temperature of the glass is below the strain point, or the temperature at which the viscosity of the glass is above $10^{14.5}$ poises, the mold is opened and the glass is removed.

By a similar procedure two or more pieces of substantially flat glass of practically any desired area, such as drawn or rolled sheet glass, may be shaped at the same time and their contacting surfaces conformed, as shown in FIG. 2.

The example above illustrates the use of a porous refractory mold which would not require the application of a parting film or colloidal refractory metallic oxide film between the surfaces of the contoured glass bodies and the contoured surfaces of the mold parts because there is no problem with adhesion or welding between glass and porous refractory materials. If a metal mold is used, where there is an adhesion problem between the metal and glass, the procedure would be identical with the above example except that in addition a colloidal refractory metallic oxide film would be applied, by the same method shown in the example, to the upper or mold contacting surface of glass body 24, and the lower or mold contacting surface of glass body 10.

A typical example of one method of carrying out the present invention is illustrated in FIG. 2 of the drawing and the following description. Two flat glass sheets 32 and 36, composed of 96% silica glass as described in United States Patent No. 2,106,744, granted February 1, 1938, to H. P. Hood and M. E. Nordberg, having a softening point of 1500° C. and an annealing point of 910° C., being one foot square in size and ⅛" thick, and a third flat glass sheet 34, being of the same composition and size and ⅜" thick, were cleansed by washing with lint-free cloths in acetone, alcohol and distilled water baths respectively and successively. The sheets were then air dried. It should be noted that additional cleaning by use of an acid bath or by baking at 400° C. to 500° C. may be employed if it is desired to remove surface absorbed impurities. A 0.5% by weight, colloidal solution of boehmite (AlOOH) alumina consisting of minute fibrils, was prepared by dispersing said alumina fibrils in water and blending same in a commercial blender. Glass sheet 32 was then immersed in said colloidal alumina solution permitting said fibrils to be deposited on its surfaces. The excess fibrils were then removed by rinsing the glass sheet in distilled water. The resulting thin uniform continuous film was air dried and subsequently baked at a temperature of 450° C. After baking, the glass sheet could be easily handled without rubbing off or otherwise damaging the film. A colloidal alumina film was then applied, in accordance with the above procedure, to glass sheet 36. Glass sheets 32, 34 and 36, were arranged one above the other, respectively, upon a contoured petalite refractory mold bottom 14, with all glass contacting surfaces separated by colloidal alumina film 38. The mold contour had an approximate chord depth of 2". A petalite refractory mold top 16, was positioned above the glass sheet 36, and the glass sheets and mold parts were properly aligned by means of the indexing marks 40 and 42. The entire assembly was placed upon refractory spacers 18, within heating oven 20, at room temperature and heated at the rate of 120° C. per hour until the assembly reached a temperature of 970° C. This temperature was then maintained for 3 to 4 hours to permit sagging and complete conformation of the glass surfaces to the mold contour. The mold top, by its weight, exerted a force of approximately one pound upon each six square inches of glass surface and this force was found to be suitable. At this time the assembly was cooled at the rate of 50° C. per hour until the strain point or a temperature of approximately 820° C. was reached and thereafter cooled at higher rates up to 120° C. per hour until room temperature was reached. The assembly was removed from the heating oven and glass sheet 34, was referenced with the indexing marks for the purpose of trimming the edges while maintaining the proper contour. After the glass sheets were removed from the mold it was found that despite a slight molecular attraction between the glass surfaces, the sheets readily separated when a razor blade or knife was inserted between them at the edge.

In the instant example, the glass sheets 32 and 36, were used as cover plates for the glass sheet 34, to provide a high optical quality contoured sheet, however, if slight mold imperfections can be tolerated, cover plates are not required. The contoured glass sheet dimensions are primarily controlled by the mold dimensions, therefore the dimensional accuracy of the glass contour is limited only by the dimensional accuracy of the mold. In practice a chord depth dimensional tolerance of ±0.001" is readily attainable.

The new method may desirably be utilized for the production of flat or curved sheets having accurately matched surface contours, which are adapted to be joined with an interposed sheet of organic plastic material between said surfaces and subsequently sealed to form laminated safety glass.

Although the present invention has been described with respect to specific details of certain embodiments thereof, it is not intended that such details be limitations upon the scope of the invention except insofar as set forth in the following claims.

What is claimed is:

1. The method of conforming the surfaces of a glass body to the contours of the surfaces of other glass-adherent through plastic flow of said glass body without adhering the glass body surfaces and without producing surface imperfections therein, which comprises applying to all contacting glass surfaces a coating of an aqueous solution of colloidal refractory metallic oxide, drying said coating to form a thin continuous uniform film of colloidal refractory metallic oxide, said metallic oxide having a melting temperature higher than the softening point of the glass of said body, placing said bodies together with their surfaces in juxtaposition and shaping said glass body to a desired contour while heating it sufficiently to permit plastic flow and conformation of the glass.

2. The method of claim 1 in which the colloidal refractory metallic oxide is colloidal alumina.

3. The method of claim 1 in which the colloidal refractory metallic oxide is colloidal zirconia.

4. The method of simultaneously conforming a plurality of glass bodies to the contours of the surfaces of other glass-adherent bodies through plastic flow of said glass bodies without adhering the surfaces of said glass bodies and without producing surface imperfections therein, which comprises applying to all contacting glass surfaces a coating of an aqueous solution of colloidal refractory metallic oxide, drying said coating to form a thin continuous uniform film of colloidal refractory metallic oxide, said metallic oxide having a melting temperature higher than the softening point of the glass of said glass bodies, placing said plurality of glass bodies and said other glass-adherent bodies together with their surfaces in juxtaposition and shaping said plurality of glass bodies to a desired contour while heating them sufficiently to permit plastic flow and conformation of the glass.

5. The method of claim 4 in which the colloidal refractory metallic oxide is colloidal alumina.

6. The method of claim 4 in which the colloidal refractory metallic oxide is colloidal zirconia.

7. In the method of conforming at least one glass body by heating while in contact with means producing requisite deformation therein, the improvement which comprises the step of applying to all contacting glass surfaces an adherent thin continuous uniform film of colloidal refractory metallic oxide having a melting temperature higher than the softening point of the glass of said body.

8. The method of conforming the surfaces of glass bodies to the contours of the surfaces of other glass-adherent bodies in contact therewith, while heated, without adhering them and without producing surface imperfections, comprising the steps of cleaning said glass bodies, applying a coating of an aqueous solution of colloidal refractory metallic oxide to the contacting glass surfaces of said glass bodies, drying said coating to form a thin continuous uniform film of colloidal refractory metallic oxide, baking said film, said refractory colloidal metallic oxide having a melting temperature higher than the softening point of said glass bodies, placing the bodies together and shaping the glass surfaces while the bodies are heated sufficiently to permit plastic flow and conformation of the glass.

9. The method of conforming the surfaces of glass bodies to the contours of the surfaces of other glass-adherent bodies in contact therewith, while heated, without adhering them and without producing surface imperfections, comprising the steps of cleaning said glass bodies, applying a coating of about 0.1% to 2.0% by weight aqueous solution of colloidal alumina to the contacting surfaces of said glass bodies, drying said coating to form a thin continuous uniform film of colloidal alumina, said film having a thickness ranging from about 50 Angstroms to about 0.1 micron, placing the bodies together and shaping the glass surfaces while the bodies are heated sufficiently to permit plastic flow and conformation of the glass.

10. The method of claim 9 comprising the further step of baking said film at a temperature of about 450° C. after said drying step.

References Cited by the Examiner

UNITED STATES PATENTS

| 2,377,849 | 6/45 | Binkert et al. | 65—107 X |
| 2,795,084 | 6/57 | Littleton | 65—60 X |
| 2,827,739 | 3/58 | Atkeson | 65—107 X |

FOREIGN PATENTS

| 548,900 | 12/56 | Belgium. |
| 770,567 | 3/57 | Great Britain. |

DONALL H. SYLVESTER, *Primary Examiner.*